UNITED STATES PATENT OFFICE.

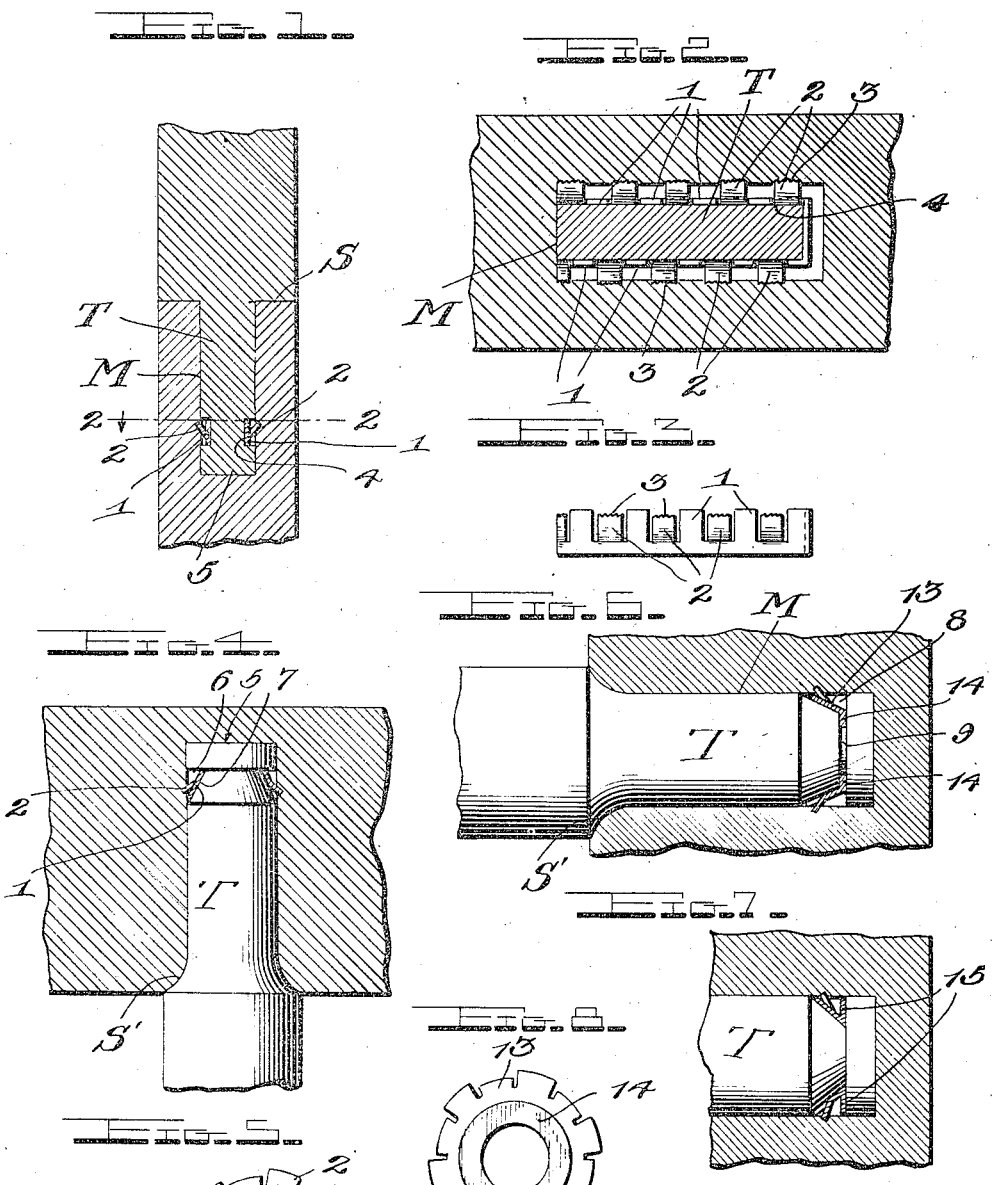

HERMAN P. NEPTUNE, OF BOULDER, COLORADO.

TENON-FASTENER.

1,083,697. Specification of Letters Patent. Patented Jan. 6, 1914.

Application filed March 17, 1913. Serial No. 754,914.

*To all whom it may concern:*

Be it known that I, HERMAN P. NEPTUNE, a citizen of the United States, residing at Boulder, in the county of Boulder and State of Colorado, have invented certain new and useful Improvements in Tenon-Fasteners; and I do declare the following to be a full, clear, and exact description of the invention, such as will enable others skilled in the art to which it appertains to make and use the same.

This invention relates to wooden joints, and more particularly to those known as mortise and tenon; and the object of the same is to produce an improved fastening device for holding the tenon in the mortise or socket.

To this end the invention consists in grooving the tenon near its outer end and in placing in the groove a strip metal fastener having a plurality of obliquely disposed tongues whose tips embed themselves in the wall of the mortise when it is attempted to withdraw the tenon—all as hereinafter more fully described and claimed, and as shown in the drawings wherein—

Figure 1 is a longitudinal sectional view through a mortise and tenon, showing the use of this improved fastener; and Fig. 2 is a cross section on the line 2—2 of Fig. 1. Fig. 3 is a side elevation of the fastener alone. Fig. 4 is a sectional view of a round tenon inserted in a socket, showing a slightly different form of the groove around the former; and Fig. 5 is a plan view of the fastener employed in this construction. Fig. 6 is a similar section of a slightly modified form of groove and the fastener therefor; Fig. 7 is a similar section of yet another modification; and Fig. 8 is an enlarged end elevation of the fastener shown in Fig. 6.

In the various sectional views of the drawings are shown two members whereof one has a socket or mortised end and the other has a pin or tenon T, and the shoulder around the base of the same may be abrupt as shown at S or of other shape as indicated at S'. It matters not whether the interengaging members are rectangular in cross section as seen in Fig. 2, or round as shown in Figs. 4, 6 and 7, the size and materials of parts are not essential, and the manner of forming and assembling them need not be elaborated. The gist of the present invention lies in the provision of means for preventing the accidental withdrawal of the tenon from the mortise—something to replace the glue commonly employed, or even the dowel pin which is sometimes driven transversely through the tenon as is too well known and understood to need elaboration.

The present invention consists in forming a groove around the tenon and placing therein a fastener which is made of a strip 1 of metal whose body is cut from one edge inward to produce a series of tongues 2, preferably having their outer extremities roughened or toothed as shown at 3.

This fastener may be sold in long strips capable of being broken or cut off at any suitable point to fit the requirements of any case. If the mortise and tenon be round, the fastener is bent into the shape of a split ring as shown in Figs. 5 and 8, as it is not necessary that the ends be connected. If the mortise and tenon be square or rectangular, the fastener may be bent into the shape illustrated in Fig. 2. However, it would suffice if a stretch of this fastener were attached in any suitable way to the tenon T and carried by it into the mortise M, and as perhaps the simplest way of attaching it to said tenon I form a groove 4 around the latter near its tip 5 and place the strip 1 in this groove. As shown in Fig. 2, the groove passes around but three sides of the rectangular tenon there illustrated; if said tenon be round the groove would doubtless extend all the way around it and the metallic strip 1 be bent into the shape of a truncated cone and sprung into place as illustrated in Fig. 8. The groove shown in Fig. 1 has two square shoulders or walls perpendicular to the axis of the tenon, the groove 6 shown in Fig. 4 has one square shoulder or wall and a second wall beveled from the inner edge of the first to the obtuse angle 7 where it runs out to nothing on the face of the tenon, the groove in Fig. 7 is similarly constructed but the fastener is formed in a slightly different manner, and the groove 8 in Fig. 6 also has one square and one beveled wall meeting in an acute angle, but in the bottom of said angle is formed a kerf 9 sawed into the member T all the way around and in a plane directly perpendicular to its axis.

The fastener will be shaped to fit the groove. With the latter formed as shown in Fig. 1, the strip 1 will be a straight, flat band of metal passing around all four sides of the tenon, or not less than three sides in any event (see Fig. 2) so that the fastener shall be held on the tenon for a purpose to be explained below. With a groove 6 having one beveled wall as shown in Figs. 4 and 7, the body of the strip 11 will lie upon the beveled wall and the tongues 12 will project from this body as shown. With the groove 8 and kerf 9 as shown in Fig. 6, the body 13 of the strip will have an inturned flange 14 which springs closely into the kerf and prevents the accidental dislodgment of the fastener. This flange may be turned outward as shown at 15 in Fig. 7, or it may be omitted as seen in Fig. 4. In all cases I would incline the tongues away from the tip 5 of the tenon, and give them such length that their aggregate contour is slightly greater than the size of the mortise M.

In assembling the two members which are to be fastened by this mortise and tenon joint, I would select the proper fastener and lay it in the groove around the tenon, whatever the shape of that groove may be. If the tenon be rectangular, the fastener might be bent around three sides of it as seen in Fig. 2, but if the tenon be round the fastener would be a split ring or truncated cone as shown in Figs. 5 and 8, and its split ends could be separated so that the ring could be sprung around the tenon and dropped into this groove whatever the shape of the latter may be. Care should be taken that the tongues project away from the tip or extremity of the tenon. The latter is then inserted in the mortise M and driven home—with or without glue or other liquid. As the tenon passes into the mortise the walls of the latter spring the tongues inward and their tips 3 slide along such walls until the tip 5 of the tenon comes to rest at the base of the mortise. The natural spring of the metal then throws the toothed extremities or tips 3 of the tongues outward and they automatically indent the walls to a slight extent. If now it is attempted to withdraw the tenon from the mortise, these toothed tips or extremities enter said mortise wall like barbs, with the result that a very firm joint is produced and at extremely little expense. I could not say which form of the device I prefer. The groove 4 having two perpendicular walls is usually easier to make and will suffice where the tenon is square or rectangular, because the abutting of one edge of the strip 1 against one of said walls will prevent the fastener from being dislodged as the tenon is driven into place. With the groove 6 having one perpendicular and one inclined wall, and the fastener made in the shape of a split ring as shown in Fig. 5, its ends must not abut, and the extremities of the tongues 2 by sliding on the mortise wall will press this ring into the groove. The flange 15 employed in Fig. 7 makes the fastener-strip more rigid and affords a larger base to resist the thrust on the tongues 2 when it is attempted to withdraw the tenon. The flange 14 shown in Fig. 6 enters the kerf 9 at the bottom of the groove, and besides making the strip more rigid holds it quite firmly in place so that it will be extremely difficult to dislodge it. These and other modifications will occur to the manufacturer and may be adopted without departing from the spirit of my invention.

What is claimed as new is:

1. The combination with a tenon having around it a groove whereof that wall next the tip is perpendicular to the axis of the tenon and the other wall is inclined; of a fastener composed of a strip of sheet metal bent into the form of a truncated cone adapted to lie on the inclined wall of said groove, and spring tongues cut from its body and inclining outward from the same at a greater angle to said axis than the inclined wall of its groove.

2. The combination with a tenon having around it a groove whereof that wall next the tip is perpendicular to the axis of the tenon and the other wall is inclined; of a fastener composed of a strip of sheet metal bent into the form of a truncated cone adapted to lie on the inclined wall of said groove, and spring tongues cut from its body and inclining outward from the same at a greater angle to the axis of the tenon than the inclined wall of its groove, the extremities of said tongues being toothed and the smaller end of the body having a flange standing in a plane at right angles to said axis and lying against said perpendicular wall.

3. The combination with a tenon having around it a groove whose wall next the tip of the tenon is perpendicular to the axis of the tenon and whose opposite wall is inclined, and a kerf formed in the angle between said walls, of a fastener consisting of a strip-metal body bent into the form of a truncated cone lying on said inclined wall and having an inturned flange at its smaller end lying in said kerf, and spring tongues cut from the other edge of said body and bent outward therefrom, for the purpose set forth.

In testimony whereof I have hereunto set my hand in presence of two subscribing witnesses.

HERMAN P. NEPTUNE.

Witnesses:
J. E. COONS,
FRED WHITE.